(12) United States Patent
Rice

(10) Patent No.: US 8,144,841 B2
(45) Date of Patent: Mar. 27, 2012

(54) MULTIMEDIA SPAM DETERMINATION USING SPEECH CONVERSION

(75) Inventor: Christopher Russell Rice, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 11/951,295

(22) Filed: Dec. 5, 2007

(65) Prior Publication Data

US 2009/0147930 A1    Jun. 11, 2009

(51) Int. Cl.
*H04M 11/00* (2006.01)
(52) U.S. Cl. .......... 379/88.14; 379/88.25; 709/206
(58) Field of Classification Search .... 379/88.12–88.14, 379/88.25; 709/206
See application file for complete search history.

(56) References Cited

U.S. PATENT DOCUMENTS

| | | | | |
|---|---|---|---|---|
| 6,161,130 | A * | 12/2000 | Horvitz et al. | 709/206 |
| 6,389,115 | B1 * | 5/2002 | Swistock | 379/88.12 |
| 6,766,316 | B2 * | 7/2004 | Caudill et al. | 1/1 |
| 7,051,077 | B2 * | 5/2006 | Lin | 709/207 |
| 7,155,243 | B2 * | 12/2006 | Baldwin et al. | 455/466 |
| 7,171,450 | B2 * | 1/2007 | Wallace et al. | 709/206 |
| 7,373,385 | B2 * | 5/2008 | Prakash | 709/206 |
| 7,533,148 | B2 * | 5/2009 | McMillan et al. | 709/206 |
| 7,577,993 | B2 * | 8/2009 | Roychowdhary et al. | 726/22 |
| 2005/0083915 | A1 | 4/2005 | Mathew et al. | |
| 2005/0259667 | A1 | 11/2005 | Vinokurov et al. | |
| 2006/0168030 | A1 | 7/2006 | Cai et al. | |
| 2006/0168031 | A1 | 7/2006 | Cai et al. | |
| 2006/0173965 | A1 | 8/2006 | Yang | |
| 2006/0256012 | A1 | 11/2006 | Fok et al. | |
| 2007/0083929 | A1 * | 4/2007 | Sprosts et al. | 726/22 |
| 2007/0124384 | A1 * | 5/2007 | Howell et al. | 709/206 |
| 2007/0133757 | A1 | 6/2007 | Girouard et al. | |
| 2007/0150276 | A1 | 6/2007 | Srivastava et al. | |
| 2007/0195751 | A1 | 8/2007 | Cai et al. | |

OTHER PUBLICATIONS

Dantu, Ram et al., "Detecting Spam in VoIP Networks," SRUTI '05: Steps to Reducing Unwanted Traffic on the Internet Workshop, available at http://www.usenix.org/events/sruti05/tech/full_papers/dantu/dantu.pdf, 2005, 7 pages.

Unknown, "VeriSign Inter-Carrier Multimedia Messaging Service (ICMMS)," available at http://www.verisign.com/static/005168.pdf, Dec. 20, 2006, 2 pages.

Unknown, "SPOTxde Content Filter," available at http://www.vantrix.com/ProductsSPOTxdeContentFilter.aspx, printed on Oct. 17, 2007, 2 pages.

Dantu, Ram et al., "Detecting Spam in VoIP Networks,"SRUTI '05: Steps to Reducing Unwanted Traffic on the Internet Workshop, available at http://www.usenix.org/events/sruti05/tech/talks/dantu.pdf, 2005, 30 pages.

* cited by examiner

*Primary Examiner* — Simon Sing
(74) *Attorney, Agent, or Firm* — Senniger Powers LLP

(57) ABSTRACT

Determining unwanted multimedia message originated from a multimedia call. An interface receives a multimedia message from a telecommunication service operator, and multimedia message is stored on a storage area. A unified communication system manages communication message delivery to at least one of the following access points for the recipient, and the unified communication system includes a processor configured to execute computer-executable instructions for identifying a voice portion from content of the received multimedia message. An anti-spam engine is applied to analyze a textual representation of the identified voice portion, and a confidence ranking of the representation is generated in response to the analyzed representation. It is determined whether the multimedia message is an unwanted multimedia message as a function of the confidence ranking and the analyzed representation.

11 Claims, 4 Drawing Sheets

FIG. 4 is an exemplary flow chart illustrating operation of determining a multimedia spam message according to an embodiment of the invention.

MULTIMEDIA SPAM DETERMINATION USING SPEECH CONVERSION

BACKGROUND

With omnipresence of the Internet and the availability of high speed Internet connections, multimedia content rendered on computers has become popular and accessible with less hassle. In addition, voice over internet protocol (VOIP) services have emerged as a new technological innovation in using the foundation of the Internet to provide voice communication services.

The popularity of multimedia and VOIP services also brings unwanted messages to the users. Similar to electronic mail (e-mail) spam, these so-called multimedia spam messages arrive at users' voicemail or videomail inboxes, answering machines, and the like. Even more so than its e-mail spam counterpart, multimedia spam is more intrusive and annoying because the multimedia spam messages may ring a person's home telephone, video phone or mobile phone while the users are at sleep. E-mail spam messages may congest a user's inbox at 2:00 A.M., but as long as a user does not open or access the inbox, the user is not immediately disturbed by the e-mail spam messages.

Existing solutions to this problem attempt to provide a content agnostic spam detection system. Some of the solutions involve identifying multimedia spam messages delivered through a telecommunication network based on the time of the day, the caller-identification (ID) information of the call, or the like. Such solutions, while stopping the user's telephone from ringing in the first place, fail to allow a user to have more determination or control in the spam decision making process.

SUMMARY

Embodiments of the invention overcome the shortfalls of existing solutions by providing a content-based or content-dependent determination of multimedia messages when a call is received from a caller. Aspects of the invention identify a voice portion of a multimedia message and perform a speech-to-text conversion so that the converted text can be analyzed by anti-spam engines. The intended recipient will be notified whether the multimedia message is a spam or not. Alternative embodiments enable the user to set additional parameters in addition to the parameters associated with the anti-spam engines.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
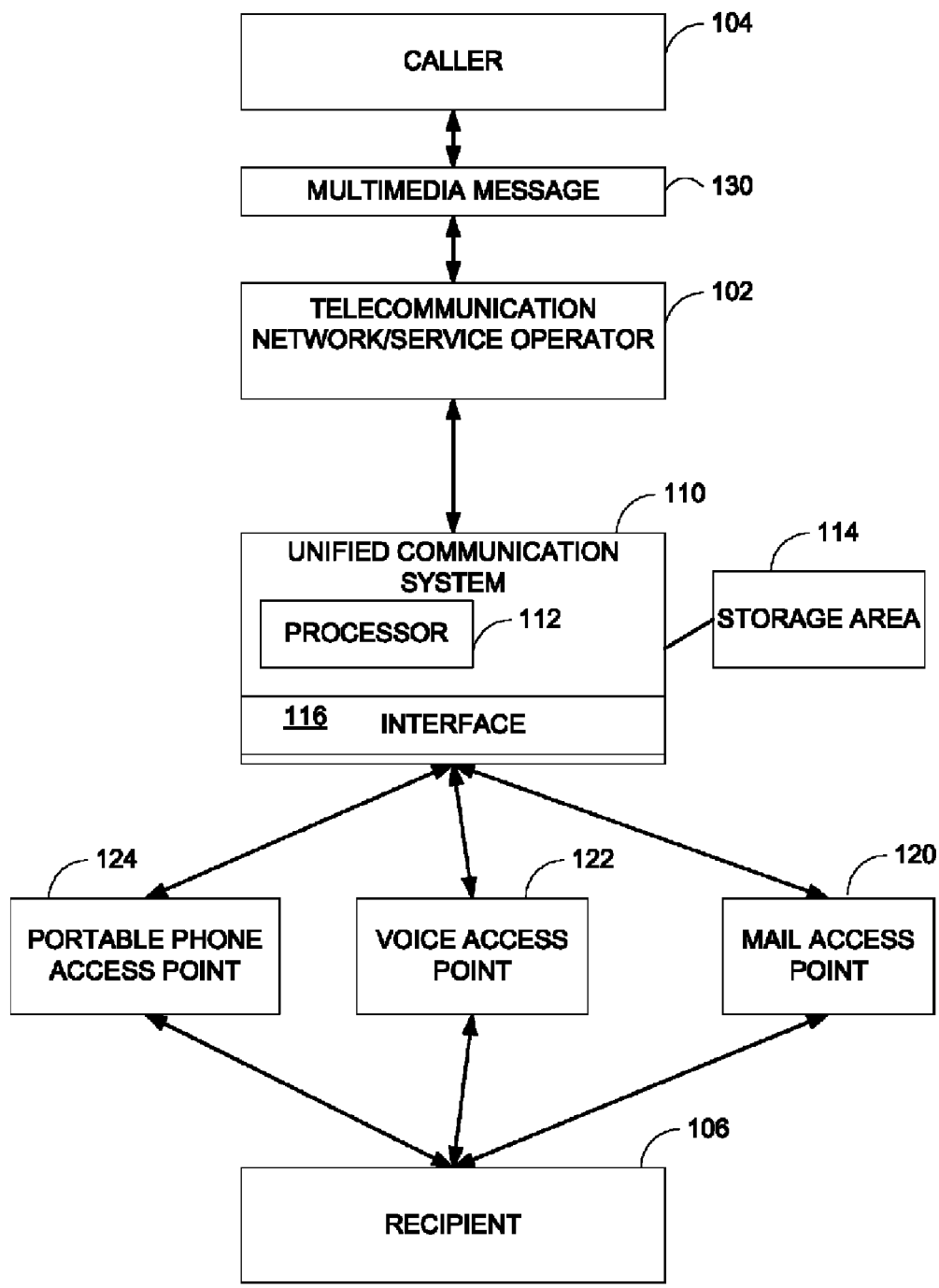
FIG. 1 is a block diagram illustrating an exemplary system for determining a multimedia spam message from a call according to an embodiment of the invention.

Embodiments of the invention improve processing of multimedia messages and determine whether a given multimedia message is considered as a spam, or unwanted multimedia message. Referring first to FIG. 1, a block diagram illustrates an exemplary system 100 for determining a multimedia spam message from a call according to an embodiment of the invention. The system 100 includes a telecommunication network or service operator 102 for providing a portion or all telecommunication services to a caller 104 and a recipient 106. For example, the telecommunication network or service operator 102 may be a telephone company or telephone service provider that facilitates and provides telephone services for the caller 104 and the recipient 106. In one example, the telecommunication network or service operator 102 may be a voice over internet protocol (VOIP) service provider. In another example, the telecommunication network or service operator 102 may be a cable or Internet service provider.

The system 100 also includes a unified communication system 110 for providing enhanced services to the caller 104 or the recipient 106 in addition to the telecommunication network or service operator 102. In one embodiment, the unified communication system 110 includes a processor 112, a storage area 114 and an interface 116. For example, the processor 112 may be a microprocessor, a central processing unit, a cluster of processing units, or the like for processing computer-executable instructions. The storage area 114 may include volatile and nonvolatile, removable and non-removable media implemented in any method or technology for storage of information such as computer readable instructions, data structures, program modules or other data. For example, the storage area 114 include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the unified communication system 110. The interface 116 may include at least a network interface for communicating the unified communication system 110 with other devices or components and/or a user interface (UI) or graphical UI (GUI) for interacting with the caller 104 or the recipient 106.

In an alternative embodiment, the unified communication system 110 may be part of a cluster or a collection of computing devices that provide various services to the caller 104 or the recipient 106. For example, the unified communication system 110 provides services through a mail access point 120, a voice access point 122, and a portable phone access point 124 to the recipient 106. It is to be appreciated that other services may be provided by the unified communication system 110 to the recipient 106 or the caller 104 without departing from the scope or spirit of the invention.

For example, the mail access point 120 may include an electronic mail (e-mail) account and service provided for the recipient 106. In other words, the recipient 106 may access e-mail messages sent or received from the mail access point 120. Other services, such as address book, calendar, tasks or other activities or features may be provided within the mail access point 120. The voice access point 122 may include voice or telephone services, such as VOIP service. The recipient 106 may use the voice access point 122 to place a voice call to a telephone number, or an internet protocol address identifying a receiving computing or electronic device. The portable phone access point 124 may include services provided for a portable or mobile phone accessible by the recipient 106. For example, the portable phone access point 124 may provide short message system (SMS) or text messages between portable and mobile telephones or between a portable telephone and an e-mail address. Hence, the unified communication system 110 provides various services to the recipient 106 and the caller 104.

Figure 2:
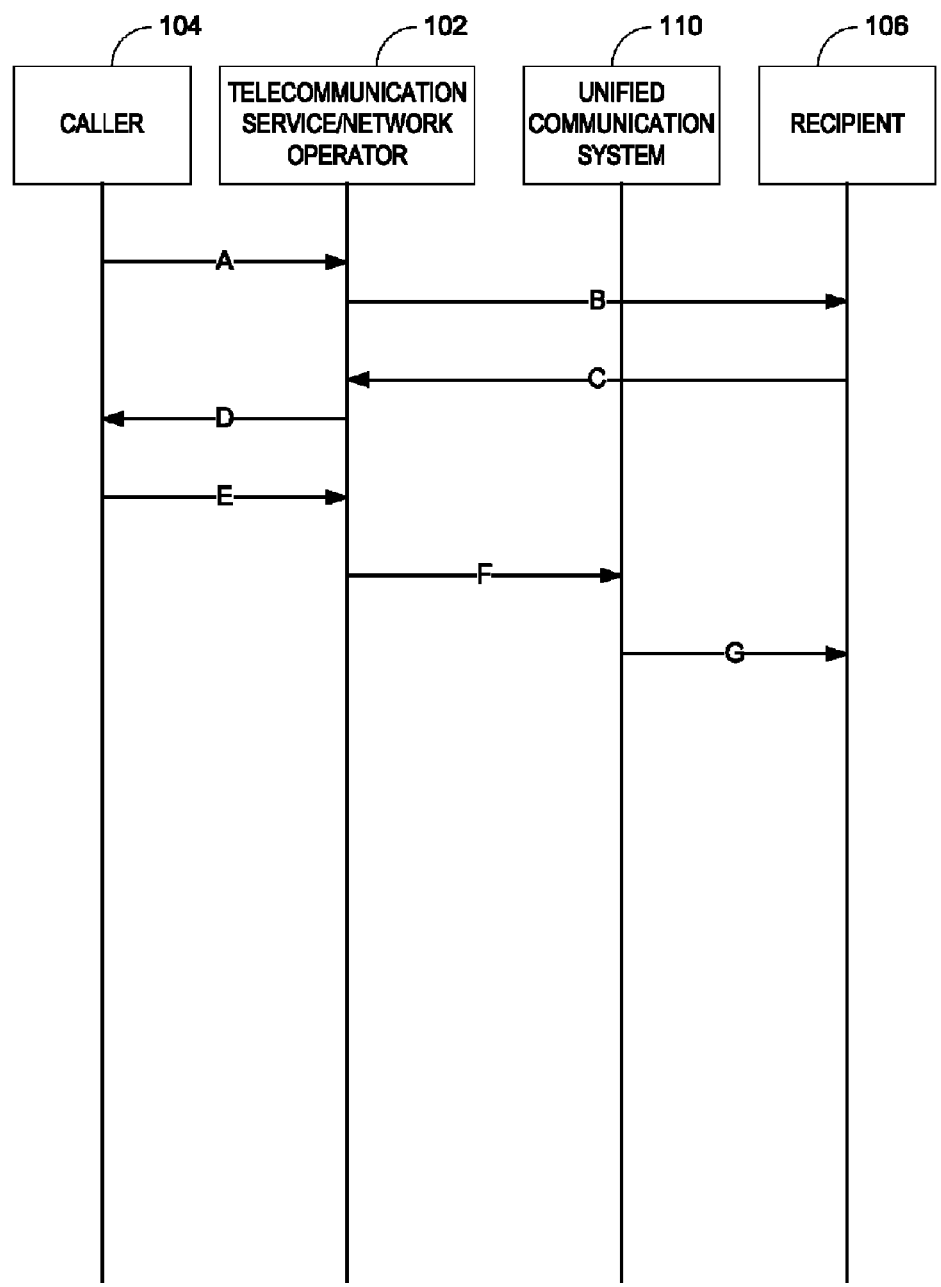
FIG. 2 is a diagram illustrating exemplary process flows for determining a multimedia spam message according to an embodiment of the invention.

Referring now to FIG. 2, a diagram illustrates process flows for determining whether a multimedia message is characterized as spam according to an embodiment of the invention. The process initially begins from the caller 104 when the caller 104 places a call destined for the recipient 106. In one embodiment, the caller 104 may wish to send a multimedia message, such as a message with voice content or a video content. The caller 104 first places the call at A, and the telecommunication network/service operator 102 receives the call. Through its network or networks, the telecommunication network/service operator 102 forwards the call to the recipient 106 at B. In this illustration, the recipient 106 is unavailable to answer the call from the caller 104. As such, a notification is sent from the recipient 106 to the telecommunication service/network operator 102 at C. The telecommunication service/network operator 102 subsequently notifies the caller 104 at D that the recipient 106 is unavailable to answer the call.

In this instance, the caller 104 agrees to leave a multimedia message 130 (as illustrated in FIG. 1) for the recipient 106. As such, the caller 104 forwards the multimedia message 130 to the telecommunication service/network operator 102 at E. The telecommunication service/network operator 102 next sends the multimedia message 130 to the unified communication system 110 at F.

Telephone network operators typically use information that identifies the source of the call or the multimedia message, without regard to content, as the basis for determining whether the multimedia message is considered as an unwanted multimedia message. For example, various methods exist to identify unwanted callers based on the caller's phone number (i.e., CallerID Blocking) or block callers who refuse to identify their phone number (i.e., Anonymous Call Blocking). However, these methods (CallerID blocking and Anonymous Call Blocking) are often insufficient to identify unsolicited multimedia messages because they are agnostic to the multimedia message content.

In contrast, embodiments of the invention determine whether a multimedia message should be considered as an unwanted message by identifying the audio content of the multimedia message to identify unsolicited/undesired messages or SPAM within the multimedia message. Embodiments of the invention include highly accurate Speech to Text processing output with known Bayesian filtering algorithms used to identify text SPAM, it becomes possible to block multimedia SPAM messages before they are delivered to the recipient's access point provided by the unified communication system. In an alternative embodiment, multimedia messages may be tagged as suspicious when delivered into the subscriber's mailbox if the determination method cannot conclude with high confidence that a multimedia message is SPAM. Additionally, multimedia messages may be automatically deleted or even not delivered at all if the unified communication system is highly confident that they are SPAM.

Therefore, at G, the processor 112 of the unified communication system 110 identifies a voice portion of the multimedia message 130. In another example, the multimedia message 130 includes some combination of text and/or speech and/or video. As described above, the multimedia message 130 may include a purely voice message or a video message having both motion picture portion and a voice portion. Aspects of the invention thus identify the necessary voice portion of the multimedia message 130 for process.

Figure 3:
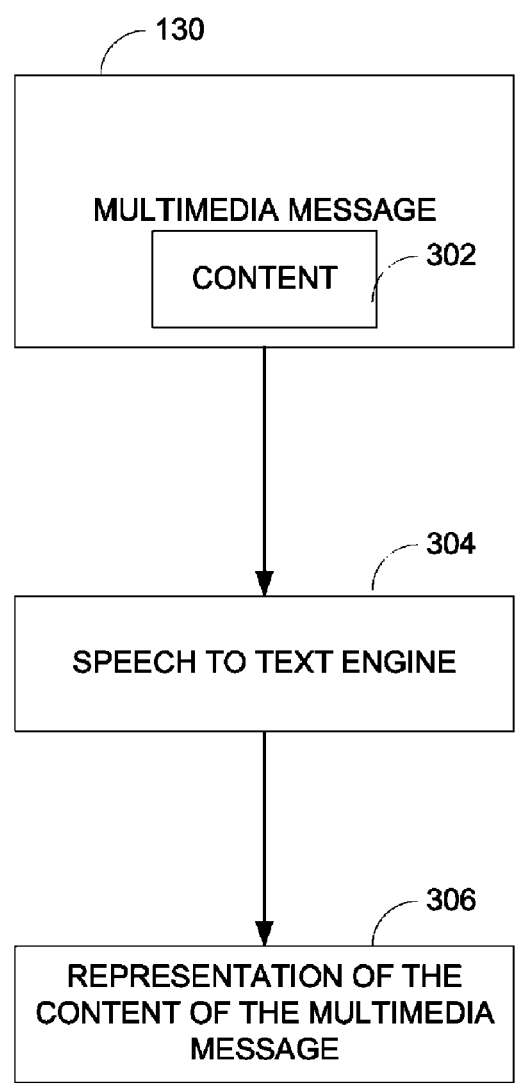
FIG. 3 is a diagram illustrating identification of voice portion of the content of the multimedia message according to an embodiment of the invention.

As an example, referring to FIG. 3, a diagram illustrates identification of a voice portion from the multimedia message 130. A content 302 included in the multimedia message 130 includes an audio portion. Once the voice portion of the audio portion is identified, the unified communication system 110 generates a representation from the identified voice portion and the representation includes at least one of the following: a text transcript and an annotated extensible markup language (XML) file. In another example, the unified communication system 110 may reduce an audio stream into an annotated text stream and even a structured annotated text stream denoting particular parts of speech (i.e., dates, proper names, phone numbers, etc) represented in XML. In one embodiment, the unified communication system 110 may include computer-executable instructions that represent a known speech-to-text engine 304, and such speech-to-text engine 304 may analyze the caller's voice first through an acoustic model that attempts to determine words and then through a language model that attempts to combine words from the acoustic model into parts of speech and ultimately sentences and paragraphs usually represented as a parse tree (the language model is very similar to how compilers assemble parse trees for programming languages like C# or C++). As such, the speech-to-text engine generates the representation of the content 302 of the multimedia message 130 at 306.

Once the unified communication system 110 generates the representation of the multimedia message 130, the representation is analyzed by applying an anti-spam engine to the generated representation. In one embodiment, the anti-spam engine employs a Bayesian filter to analyze the representation. For example, the unified communication system 110 employs a Bayesian filter which examines the generated representation for specific keywords statistically likely to be associated with SPAM for a specific written language. By examining the total number of occurrences of those keywords and weighting them appropriately, a probability that a given text based message is SPAM can be assigned. In one embodiment, a confidence ranking (e.g., from 0% to 100%) is generated based on the probability.

In another example, Bayesian keyword filtering assigns a probability that any given multimedia mail is SPAM and ultimately notify the recipient 106. The output of this method may be a text, video or audio annotation combined with the original multimedia message indicating there is high probability that the multimedia message contains unsolicited, undesired or SPAM content. This annotation can be used to proactively delete the multimedia message or simply alert the recipient 106.

Based on this confidence ranking, the unified communication system 110 determines whether the multimedia message 130 is considered as an unwanted message.

In one embodiment, if the multimedia message is a voicemail or is determined to contain voice media only, the unified communication system 110 generates a text transcript or annotated XML representation for the voice media using a speech to text engine. On the other hand, if the multimedia message is determined to be a videomail, the unified communication system 110 extracts the voice portion and generates a text transcript or annotated XML representation for the voice portion of the videomail using a speech to text engine. Once the text transcript and/or annotated XML representation of the voice media has been produced, the unified communication system 110 may generate a "confidence ranking" or "ranking" using an anti-SPAM engine expressed as a confidence percentage (e.g., 0.00% to 100.00%) based on the qualitative "ranking" produced and two ranking thresholds, such as a deletion threshold and a suspicion threshold. In one embodiment, the deletion threshold and the suspicion threshold may be defined by the unified communication system 110 or the recipient 106.

In one embodiment, depending on the outcome of the determination above, aspects of the invention proactively filter the multimedia message 130 and do not deliver it to the recipient 106. Alternatively, the unified communication system 110 may deliver the multimedia message to the recipient 106 with a visual (e.g., text cue stating that the message is deemed or highly likely to be spam) or an audio (e.g., spoken cue saying that the message is deemed or highly likely to be SPAM) notification. An audio notification may be combined with the multimedia message 130 as a prefix. For example, "The following message is SPAM" spoken followed by the original audio of the multimedia message," may be used as the notification.

Figure 4:
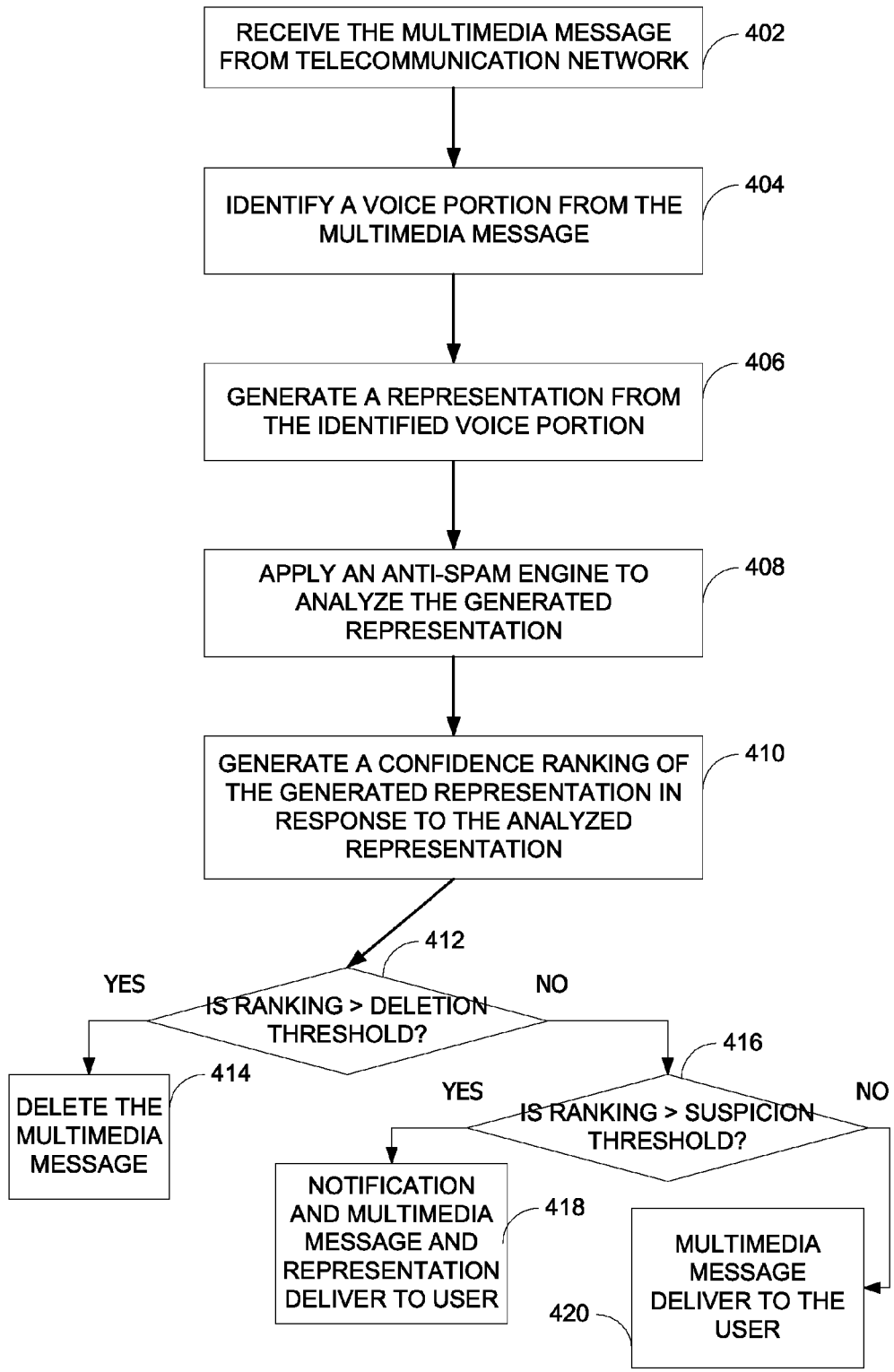
FIG. 4 is an exemplary flow chart illustrating operation of determining a multimedia spam message according to an embodiment of the invention.

FIG. 4 illustrates an exemplary flow chart showing an operation of determining a multimedia spam message according to an embodiment of the invention. A multimedia message is received from telecommunication network at 402. A voice portion is identified from the received multimedia message at 404. At 406, a textual representation is generated from the identified voice portion. For example, the textual representation includes at least one of the following: a text transcript and an annotated extensible markup language (XML) file. At 408, an anti-spam engine is applied to analyze the generated representation. In one embodiment, a Bayesian filter is used as a part of the anti-spam engine in analyzing the generated representation. A confidence ranking of the generated representation is generated in response to the analyzed representation at 410. Next, the multimedia message is determined to be a SPAM, possibly SPAM or not SPAM multimedia message as a function of the confidence ranking and the analyzed representation.

At 412, a determination is made as to whether the confidence ranking is greater than a deletion threshold. If the determination is positive, the multimedia message 130 is removed from the unified communication system 110 and the multimedia message 130 is not delivered to the recipient 106 at 414. On the other hand, if the determination is negative (i.e., the multimedia message 130 is not a clear spam message and the confidence ranking is less than the deletion threshold), a next determination is made as to whether the confidence ranking is greater than a suspicion threshold at 416. If the determination is positive, a notification and the multimedia message 130 and representation are delivered to the recipient 106 at 418. At 420, if the determination is negative (i.e., the multimedia message is not identified as a spam), the multimedia message 130 is delivered to the recipient 106.

In operation, a caller (e.g., caller 104) leaves a voicemail or videomail message for a recipient after being unable to deliver an original call to a recipient. For example, the caller may wish to call the recipient's phone number associated with a portable phone or landline network operator. The telecommunication network/service operator utilizes a published application programming interface (API) exposed and implemented by the unified communication system 110 to transmit the voicemail or videomail content in the multimedia message 130. The unified communication system 110 determines if it has received a voicemail or videomail message by examining the media content.

In one embodiment, if the unified communication system 110 determines that a voicemail has been received, it will proceed to process the voicemail. On the other hand, if the unified communication system 110 determines that a videomail has been received, it will extract the voice component of the videomail and proceed to process the videomail.

The unified communication system 110 may use a speech to text engine to convert the voicemail or voice component of a videomail into a text transcript and/or annotated XML voice representation. The unified communication system 110 may use a Bayesian filter based anti-spam engine to analyze the text transcript and/or annotated XML voice representation and produce a numerical ranking, such as confidence ranking. This numerical ranking represents the probability that the multimedia message is SPAM (0.00% to 100.00%).

If the confidence ranking produced is larger than a deletion threshold defined by the unified communication system 110, the multimedia message may be deleted and not delivered to the recipient. Furthermore, if the confidence ranking produced is larger than a suspicion threshold defined by the unified communication system 110 but is lower than a deletion threshold, the multimedia message 130 may be delivered to the recipient with a voice annotation or a notification indicating that the multimedia message is considered SPAM. This voice annotation may include spoken words in the recipient's selected language (i.e., English, Spanish, French, etc). An example may be "This message is considered SPAM" followed by the original voicemail or videomail multimedia message received from the telecommunication network/service operator.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for determining an unwanted multimedia message originating from a multimedia call, said multimedia call being initiated by a caller for a recipient and received by a telecommunication network servicing the recipient, said telecommunication network being unable to complete the call to the recipient and prompting the caller to leave a multimedia message for the recipient, said method comprising:

receiving the multimedia message from the telecommunication network;
identifying a voice portion of the received multimedia message;
generating a textual representation of the identified voice portion;
applying an anti-spam engine to analyze the generated representation;
generating a confidence ranking of the generated representation in response to the analyzed representation;
determining whether the multimedia message is the unwanted multimedia message as a function of the confidence ranking and the analyzed representation;
comparing the generated confidence ranking with a deletion threshold and removing the multimedia message if the confidence ranking exceeds a deletion threshold;
comparing the generated confidence ranking with a suspicion threshold and the deletion threshold, and generating a notification to the recipient when delivering the multimedia message to the recipient if the confidence ranking exceeds the suspicion threshold but is lower than the deletion threshold, wherein the notification comprises at least one of the following: an audio message indicating the multimedia message from the caller is considered as a unwanted message and a textual message indicating the multimedia message from the caller is considered as a unwanted message.

2. The method of claim 1, wherein the applying comprises applying a Bayesian filter to the generated representation, and wherein the generating comprises generating the confidence ranking of the generated representation after applying the Bayesian filter.

3. The method of claim 1, wherein the deletion threshold is determined by at least one of the following: the recipient and a unified communication system, and wherein the suspicion threshold is determined by at least one of the following: the recipient and the unified communication system.

4. The method of claim 1, wherein the multimedia message comprises at least one of the following: a voice message and a video message.

5. The method of claim 1, wherein the generated representation includes at least one of the following: a text transcript and an annotated extensible markup language (XML) file.

6. A system for determining an unwanted multimedia message originating from a multimedia call, said multimedia call being initiated by a caller for a recipient and received by a telecommunication service operator servicing the recipient, said telecommunication service operator being unable to complete the call to the recipient and prompting the caller to leave a multimedia message for the recipient, said system comprising:

an interface for receiving the multimedia message from the telecommunication service operator;
a storage area for storing the multimedia message;
a unified communication system for managing communication message delivery to at least one of the following access points for the recipient: a mail access point, a voice access point, and a portable phone access point; and wherein
said unified communication system includes a processor configured to execute computer-executable instructions for:
identifying a voice portion from content of the received multimedia message;
generating a textual representation of the identified voice portion;
applying an anti-spam engine to analyze the generated representation;
generating a confidence ranking of the generated representation in response to the analyzed representation;
determining whether the multimedia message is the unwanted multimedia message as a function of the confidence ranking and the analyzed representation;
comparing the generated confidence ranking with a deletion threshold and removing the multimedia message if the confidence ranking exceeds a deletion threshold;
comparing the generated confidence ranking with a suspicion threshold and the deletion threshold, and generating a notification to the recipient when delivering the multimedia message to the recipient if the confidence ranking exceeds the suspicion threshold but is lower than the deletion threshold, wherein the notification comprises at least one of the following: an audio message indicating the multimedia message from the caller is considered as a unwanted message and a textual message indicating the multimedia message from the caller is considered as a unwanted message, and
wherein the interface provides the notification to the recipient at the access point in response to the determination.

7. The system of claim 6, wherein the processor is configured to apply a Bayesian filter to the generated representation, wherein the processor is configured to generate the confidence ranking of the generated representation after applying the Bayesian filter.

8. The system of claim 6, wherein the deletion threshold is determined by at least one of the following: the recipient and a unified communication system, and wherein the suspicion threshold is determined by at least one of the following: the recipient and the unified communication system.

9. The system of claim 6, wherein the multimedia message comprises at least one of the following: a voice message and a video message.

10. The system of claim 6, wherein the generated representation includes at least one of the following: a text transcript and an annotated extensible markup language (XML) file.

11. A method for determining an unwanted multimedia message originating from a multimedia call, said multimedia call being initiated by a caller for a recipient and received by a telecommunication network operator servicing the recipient, said telecommunication network operator being unable to complete the call to the recipient and prompting the caller to leave a multimedia message for the recipient, said method comprising:

receiving the multimedia message from the telecommunication network operator, said multimedia message including at least one of the following: a voice message and a video message;
identifying a voice portion of the received multimedia message;

generating a representation of the identified voice portion, said representation including at least one of the following: a text transcript and an annotated extensible markup language (XML) file;

applying an anti-spam engine to analyze the generated representation, said anti-spam engine applying a Bayesian filter to the generated representation and generating a confidence ranking thereof in response to the analyzed representation after applying the Bayesian filter;

determining whether the multimedia message is the unwanted multimedia message as a function of the confidence ranking and the analyzed representation;

delivering a notification indicative of the determining to a mail inbox of the recipient, wherein delivering the notification comprises delivering at least one of the following: an audio message indicating the multimedia message from the caller is considered as a unwanted message and a textual message indicating the multimedia message from the caller is considered as a unwanted message;

comparing the generated confidence ranking with a deletion threshold and removing the multimedia message if the confidence ranking exceeds a deletion threshold; and comparing the generated confidence ranking with a suspicion threshold and the deletion threshold, and generating a notification to the user when delivering the multimedia message to the user if the confidence ranking exceeds the suspicion threshold but is lower than the deletion threshold.

* * * * *